United States Patent [19]
Leseman et al.

[11] Patent Number: 5,079,066
[45] Date of Patent: Jan. 7, 1992

[54] TAPE HAVING IMPROVED TEAR STRENGTH

[75] Inventors: Ronald P. Leseman, Newport; Robert L. Gordier, Fridley, both of Minn.; Stephen C. Koehn, Round Rock, Tex.; Dart S. Moy, St. Paul; Thomas L. Wood, Maplewood, both of Minn.

[73] Assignee: Minnesota Mining and Manufacturing Company, St. Paul, Minn.

[21] Appl. No.: 250,182

[22] Filed: Sep. 29, 1988

Related U.S. Application Data

[63] Continuation-in-part of Ser. No. 196,181, May 25, 1988.

[51] Int. Cl.$^5$ .............................. C09J 7/00; B32B 3/22
[52] U.S. Cl. ..................................... 428/167; 428/294; 428/295; 428/352; 428/354
[58] Field of Search ............... 428/292, 294, 295, 343, 428/352, 354, 40, 167

[56] References Cited

U.S. PATENT DOCUMENTS

| | | | |
|---|---|---|---|
| 2,750,314 | 6/1956 | Bemmels | 428/354 |
| 2,750,315 | 6/1956 | Tierney | 154/53.5 |
| 2,750,316 | 6/1956 | Bemmels | 428/295 |
| 2,753,285 | 7/1956 | Pahl et al. | 428/295 |
| 3,179,552 | 4/1965 | Hauser | 428/351 |
| 3,445,319 | 5/1969 | Dawbarn | 428/294 |
| 3,700,536 | 10/1972 | Bentvelzen et al. | 428/294 |
| 3,793,130 | 2/1974 | Marzocchi | 428/295 |
| 3,888,805 | 6/1975 | Van Gils et al. | 428/295 |
| 3,919,377 | 11/1975 | Dow et al. | 264/147 |
| 4,083,914 | 4/1978 | Schlippers et al. | 264/147 |
| 4,315,963 | 2/1982 | Havens | 428/35 |
| 4,397,905 | 8/1983 | Dettmer et al. | 428/180 |
| 4,434,204 | 2/1984 | Hartman et al. | 428/294 |
| 4,454,184 | 6/1984 | Britton | 428/295 |
| 4,454,192 | 6/1984 | Suzuki | 428/294 |
| 4,499,040 | 2/1985 | Maemoto et al. | 264/167 |
| 4,536,362 | 8/1985 | Donaldson | 264/171 |
| 4,592,938 | 6/1986 | Benoit | 428/35 |
| 4,713,283 | 12/1987 | Cogswell | 428/294 |
| 4,731,280 | 3/1988 | Geisseler | 428/163 |
| 4,770,490 | 9/1988 | Gruenewald et al. | 428/295 |
| 4,816,316 | 3/1989 | Robbins, III | 428/161 |

FOREIGN PATENT DOCUMENTS

| | | | |
|---|---|---|---|
| 32760/71 | 2/1983 | Australia . | |
| 227386 | 9/1985 | Fed. Rep. of Germany | 428/294 |

OTHER PUBLICATIONS

*Primary Examiner*—Jenna Davis
*Attorney, Agent, or Firm*—Gary L. Griswold; Walter N. Kirn; David L. Weinstein

[57] ABSTRACT

Tape comprising a backing bearing on at least one major surface thereof a plurality of ribs disposed substantially longitudinally thereon, and further bearing on at least one major surface thereof a layer of adhesive. The ribs are joined to the backing such that the contact angle between the ribs and the surface of the backing ranges from about 10° to about 160°. At least 50% of the cross-section of the ribs must project from the rib-bearing surface of the tape. It is preferred that the adhesive be a pressure-sensitive adhesive. The tape of this invention can be prepared by means of coextrusion techniques.

12 Claims, 3 Drawing Sheets

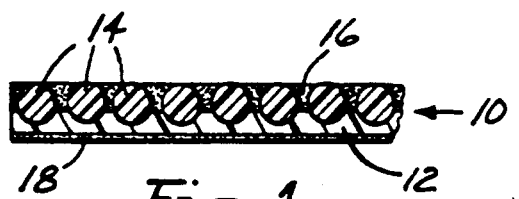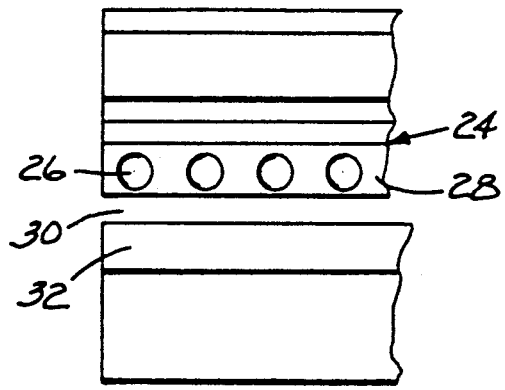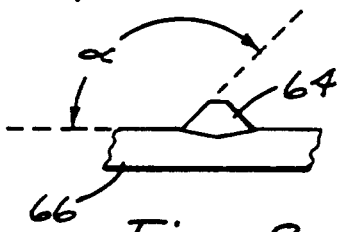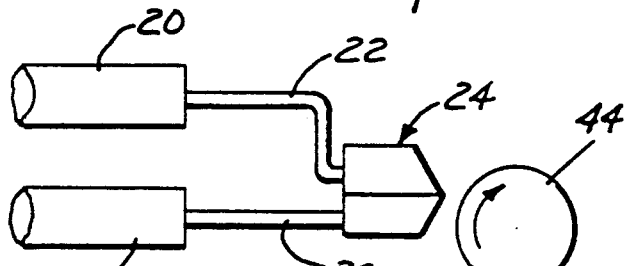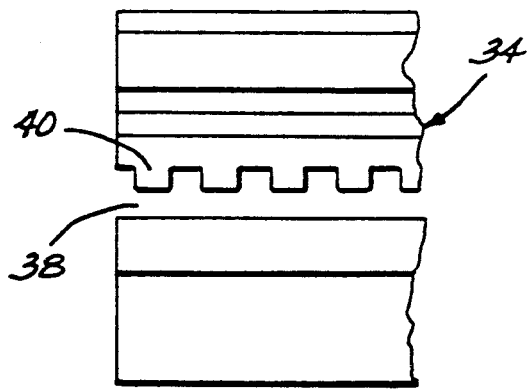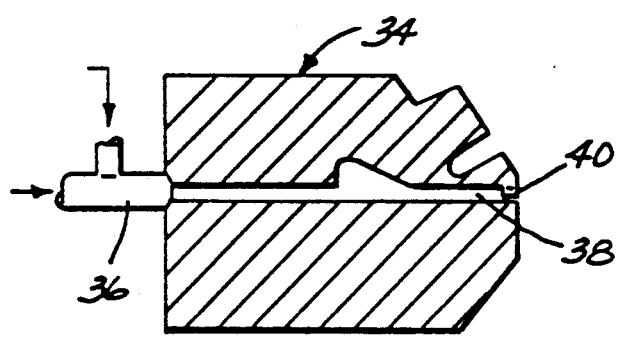

TAPE HAVING IMPROVED TEAR STRENGTH

This application is a continuation-in-part of U.S. Ser. No. 196,181, filed May 25, 1988.

BACKGROUND OF THE INVENTION

1. Field of the Invention

The present invention relates to reinforced pressure-sensitive adhesive tapes, and to a method and apparatus for making these tapes.

2. Description of the Prior Art

Reinforced tapes, also known as filament tapes, generally comprise a backing having adhered to one major surface thereof a plurality of yarns, which comprise a multiplicity of glass or synthetic polymeric filaments, by means of an adhesive. Alternatively, the yarns can be replaced by individual filaments. Typically, a layer of pressure-sensitive adhesive is then applied over the yarn-or filament-bearing surface of the tape. Filament tapes can be made by applying continuous filaments or yarns drawn from warp beams or spools to a substrate, e.g., a film or paper backing. U.S. Pat. No. 2,750,315 discloses a process in which a film or paper backing is first coated with an adhesive solution and then dried sufficiently to remove the bulk of the solvent. Then, synthetic polymeric yarns are laminated to the backing. The yarn-bearing backing is then coated with a second adhesive solution and then dried again. The finished tape is then wound into a jumbo roll, slit, and wound into tape rolls in a conventional manner. This method is also applicable to untwisted mono-fiber filaments. During all of these steps, many problems can occur. One of the most common problems is breakage of the filaments from the warp beams during the lamination step. Much time must be spent during initial set-up to thread the individual yarns from the warp beam into the yarn combs in order to provide proper alignment of yarns during the laminating step. The processing of hundreds of yarns, which are very fragile, is difficult. Selection of optimum process conditions, such as yarn tension, adhesive coating, and lamination, is critical to minimize waste and rework. Another problem is compatibility of the adhesive systems with the yarns of the tape. Although the adhesive does surround the individual yarns which are comprised of bundles of filaments, it does not coat each individual filament. This can result in poor bond between the adhesive and the surface of the filament.

U.S. Pat. No. 4,592,938 discloses a method for producing an internally reinforced film web through coextrusion of two polymeric materials. Tensile strength is enhanced by means of flat reinforcing strips embedded within the matrix material of the film web in the longitudinal direction of the film web. The primary use of the film is to reinforce plastic bags and components thereof.

U.S. Pat. No. 4,536,362 discloses a process for making a plastic film having longitudinal ribs by extrusion of a resin through a pair of spaced die lips. One of the die lips is provided with slots which runs at an angle to the direction of flow of resin across the die lips. Impurities in the resin are collected by and retained in the slots provided in one of the die lips. This occurs because of the shear stress field created by the arrangement of the slots during the extrusion process; consequently, all the impurities in the resin are collected and contained in the thickened rib portion of the film, thus reducing the deleterious effects of the impurities upon film performance.

U.S. Pat. No. 4,454,192 discloses a process of making a pressure-sensitive sheet adhesive tape by burying a plurality of artificial filament yarns in the sheet and then embedding the filament yarns with a suitable adhesive. The artificial yarns are buried in one side of the sheet so that at least half of the sections of filament yarns are exposed to permit embedding in the adhesive layer. This procedure is subject to many of the same mechanical processing problems which involve application of yarns onto a tape backing, e.g., yarn breakage, loss of equipment run time, and quality of the material.

Although filament tapes are extremely useful, the cost of making them is high because of the high cost of filaments and the high cost of processing. In order to reduce the cost of making filament-reinforced tapes, some manufacturers have resorted to reducing the number of filaments adhered to the backing. However, this expedient reduces the tear strength of the tape.

While high quality filament-reinforced tapes are known to have an extremely high level of tear strength, they are generally used only once, thus making their use costly to the consumer. It is therefore desired to have a tape having a reasonably high level of tear strength, but at a much lower cost than that of high quality filament-reinforced tapes.

SUMMARY OF THE INVENTION

This invention provides a tape comprising a backing bearing on at least one major surface thereof a plurality of ribs disposed substantially longitudinally thereon and further bearing on at least one major surface thereof a layer of adhesive. As used herein, the term "tape" encompasses both tapes produced in wide widths and tapes slit to narrower widths. Both the backing and the ribs are made of polymeric material. In the preferred embodiment, the ribs are joined to the backing such that the contact angle between the ribs and the surface of the backing ranges from about 10° to about 160°. As used herein, "contact angle" means the angle between the plane of the backing and the tangent to the rib at the point where the rib contacts the backing. There must be a sufficient mass of ribs projecting from the rib-bearing surface of the tape to provide enhanced tear strength in the cross-direction of tape. In tapes of this invention wherein the ribs are prepared by means of extrusion and are fused to a backing, it has been found that at least 50%, preferably 80%, of the original cross-section of the ribs must project from the rib-bearing surface of the tape. In the preferred embodiment, the layer of adhesive is made of a pressure-sensitive adhesive. The tape can also be calendered to modify the properties thereof. The tape provides improved tear strength in the cross direction compared to conventional flat tapes. The tape also provides high strength in the machine direction. The cost of this tape is much lower than that of conventional filament-reinforced tapes.

The tape of this invention is preferably prepared by means of coextrusion. There are at least two excellent embodiments involving coextrusion. Both embodiments involve the following steps:

(1) delivering the material for the backing to the extrusion die by way of one extruder and the material for the ribs to the extrusion die by way of a second extruder;

(2) extruding both materials through the die onto a driven chilled roll, the molten rib material touching and bonding to the molten backing material;
(3) orienting the rib-bearing article in the machine direction by way of molecular orientation,
(4) coating a layer of adhesive on one major surface of the oriented rib-bearing article.

In one embodiment, a first molten resin and a second molten resin are extruded through a single manifold die having a slot having elongated sides, with a plurality of small openings formed along at least one of said elongated sides. By means of this method, the ribs and the backing are extruded from the same die simultaneously. In a second embodiment, a first molten resin is extruded through the first manifold of a dual manifold die having a slot with elongated sides to form the backing. A second molten resin is extruded through the second manifold of a dual manifold die having a plurality of openings to form the ribs. The extruded ribs are directed to the backing and fuse therewith to form a rib-bearing backing. Preferably, the ribs are directed to the backing by means of gravity.

BRIEF DESCRIPTION OF THE DRAWINGS

FIG. 1 shows one embodiment of a cross section of the tape of the present invention.

FIG. 2 shows a schematic diagram of the extruding system of the present invention.

FIG. 5 shows an enlarged front elevational view of a portion of the die of FIG. 4 having tubular orifices.

FIG. 6 shows a cross-sectional view of a second embodiment of a die useful in the present invention.

FIG. 7 shows an enlarged front elevational view of a portion of the die of FIG. 6 having a notched orifice.

FIG. 8 shows an enlarged elevational view of a rib adhered to the backing in the tape of the present invention, along with the contact angle measurement of that rib.

DETAILED DESCRIPTION OF THE INVENTION

Figure 3:
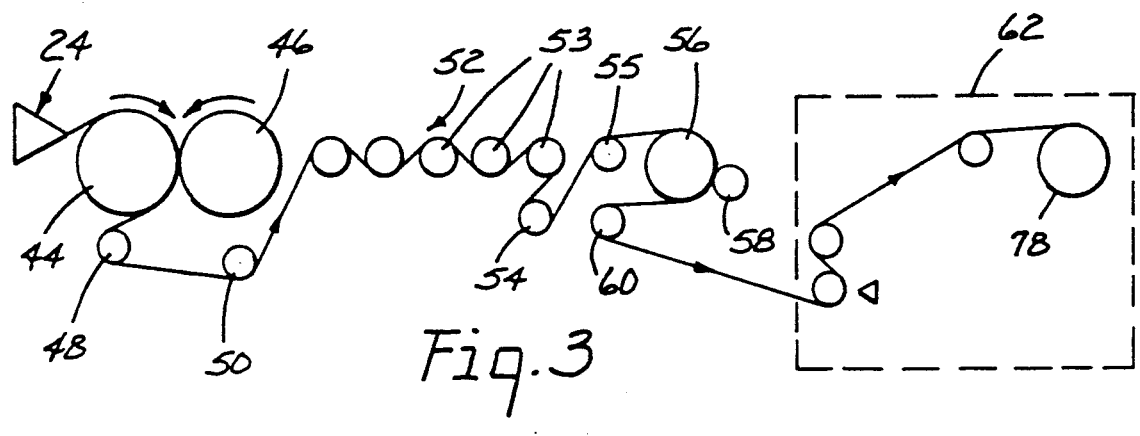
FIG. 3 shows a schematic diagram of the system used to extrude, orient, and wind up the tape of the present invention.

Referring to FIG. 1, the tape 10 of this invention comprises a backing 12 bearing on at least one major surface thereof a plurality of ribs 14 that extend substantially longitudinally in the machine direction thereon. On at least one major surface of the tape 10 is disposed a layer of adhesive 16, preferably pressure-sensitive adhesive.

Backing 12 can be formed from any extrudable film-forming polymeric material. Polymeric materials suitable for the backing include polyesters, such as polyethylene terephthalate and polybutylene terephthalate; polyolefins, such as polyethylene and polypropylene; vinylidene chloride-vinyl chloride polymers; vinyl chloride polymers, such as copolymers of vinyl chloride and vinyl acetate; polyvinyl alcohols; polyamides, such as nylon; flexible acrylates and methacrylates.

The thickness of backing 12 preferably ranges from about 0.0127 mm to about 0.254 mm. Backing 12 is preferably sufficiently flexible so that it can be wound into a roll.

Ribs 14 can be formed from any extrudable polymeric material. Suitable materials include the same materials that can be used to form the backing. Thickness, diameter, or cross-sectional dimensions, of ribs 14 is determined by the shape of the die orifice opening, the relative die angle, the position or location of the orifice openings, the rate of draw on the extrudate, the rate of quenching of the material leaving the die orifice, and the longitudinal stretch ratio. All of these parameters are well-known to those of ordinary skill in the art of extrusion. It is preferred that there be at least 10, more preferably at least 20, most preferably at least 30 ribs per inch width of backing.

Before orienting of the tape, the ribs typically have a substantially circular cross-section or an "omega" (Ω) shaped cross-section, depending upon the shape of the die orifice openings. After orienting, the cross-section of the ribs often becomes distorted, for example, it may flatten, elongate, or vary in some other manner. The contact angles made by the ribs with respect to the surface of the backing can range from about 10° to about 160°, preferably from about 10° to about 140°. At angles lower than 10°, it becomes harder to process using conventional extrusion equipment and commercially feasible speeds. At angles higher than 160°, the cross-directional tear resistance becomes unacceptably low. The mass of ribs projecting from the rib-bearing surface of the tape must be sufficient to provide improved tear strength in the cross-direction of the tape. In tapes of this invention wherein the ribs are prepared by means of extrusion, the ribs tend to fuse to the backing, regardless of whether the backing is pre-formed or coextruded with the ribs. Upon fusing, part of the mass of the ribs flows into the spaces between the ribs, thereby distorting the original cross-section of the ribs, i.e., the original cross-section as viewed immediately upon emerging from the extrusion die. It has been found that at least 50%, preferably at least 80%, of the original cross-section of the ribs must project from the rib-bearing surface of the tape.

Adhesives that can be used for adhesive layer 16 include, for example, pressure-sensitive adhesives and hot-melt adhesives. Pressure-sensitive adhesives are preferred for the present invention. Pressure-sensitive adhesives are well-known to those of ordinary skill in the tape art and are described in *Encyclopedia of Polymer Science and Technology*, Vol. 1, Interscience Publishers (New York: 1964), pp. 445-550, incorporated herein by reference. Representative examples of pressure-sensitive adhesives suitable for this invention include acrylates, resin-tackified natural rubber adhesives, and tackified block copolymers.

An optional low adhesion backsize layer 18 can be coated onto the major surface of backing 12 opposite the surface bearing the adhesive. Low adhesion backsizes are known to one of ordinary skill in the art and are described, for example, in U.S. Pat. Nos. 2,532,011, 2,607,711, and 3,318,852, all of which are incorporated herein by reference.

The total weight of the tape can be similar to the total weight of conventional thermally adhesive or pressure-sensitive adhesive tapes, generally from about 50 g/m$^2$ to about 400 g/m$^2$, preferably 100 g/m$^2$ to 350 g/m$^2$.

The tensile strength at break or the tape preferably exceeds 100 lb./lineal inch, and preferably ranges from about 100 lb./lineal inch to about 400 lb./lineal inch. Elongation preferably ranges from 10 to 50%, more preferably from 10 to 30%.

Cross-direction tear resistance is influenced by the contact angle of the rib with respect to the backing. Generally, a rib having a contact angle of less than 100° will exhibit excellent tear resistance. Ribs having a contact angle above about 130° will exhibit marginal to poor tear resistance, but will still be superior to a flat film. Cross-direction tear resistance preferably exceeds 3 lb.

Tape unwind preferably ranges from 5 to 40 oz. per inch. Adhesion to steel preferably exceeds 30 oz. per inch.

The tape of this invention has numerous advantages over tape of the prior art. Because the ribs are not adhered to the backing by pressure-sensitive adhesives, drying ovens are not needed for processing the adhesive used to adhere conventional filaments to a backing. Furthermore, there is no need for primer coats to adhere the ribs to the backing. Many of the problems that arise because of the use of filaments are eliminated, such as, for example, lifting, separation, puckering, cockling of filaments, or spiraling of tape. The tape can be made to have a uniform appearance, because the shape and size of the ribs can be easily controlled.

The tape of this invention can be made to have a tensile strength comparable to that of a conventional filament-reinforced tape and comparable to that of a tape that is flat and that has been tensilized in the machine direction. The tape of this invention exhibits advantage over that of a flat tape construction in that it provides for very good cross directional tear resistance due to the resistance provided by the substantially longitudinal ribs. As used herein, the term "cross direction" means the dimension at right angles to the machine direction of a sheet of tape. The term "machine direction" means the circumferential direction of a roll of tape. This ribbed construction is at least 100 percent stronger than a flat tape, when either has been cut or nicked. The resistance provided by the ribs on the backing inhibits tear propagation across the remaining portion of the cross direction. A flat film construction, when nicked or cut, will tear immediately across the cross direction of the film placed under tension.

The tape of this invention exhibits advantages over glass-reinforced tapes when torn in the cross direction because, unlike glass-reinforced tapes, it doesn't suffer from a glass to glass abrasion factor. This abrasion factor is present within an individual yarn and between adjacent yarns. Glass-reinforced tapes may tear all the way across the tape in the cross direction due to this abrasion phenomenon. The tape of this invention will tend to fracture in the machine or longitudinal direction when torn in the cross direction. When comparing the tape of this invention with glass-reinforced tapes, the value of cross-tear resistance may be higher for the glass-reinforced tapes. This value, as measured by the cross direction tear method outlined in the test method section described below, can be misleading due to the inability to make accurate measurements of tear resistance force values from the "Instron" chart recorder, because the better modes of tape of this invention will always fracture in the machine (longitudinal) direction and the poorer modes will propagate a tear in the cross direction of the specimen under test.

The cost of the tape of this invention is lower than that of filament-reinforced tape of the prior art, typically amounting to only about 50 percent of the cost, chiefly on account of the unique method of processing and elimination of the high cost of purchasing the filaments and applying them to a backing. The product of this invention eliminates much of the cost arising from the expected tape defects resulting from necessary treatments of raw materials prior to their introduction into tape-making equipment and additional converting that is required before raw materials can be combined into a tape product.

It is preferred to make the tape of this invention by means of a coextrusion process for the following reasons:

(1) The tape can be made in a single processing step by means of coextrusion of ribs, backing, and applications of adhesive and release coats.

(2) There is no additional high cost associated with the purchase of the raw materials and additional processing that is required to make a conventional filament-reinforced tape product.

(3) The tape produced according to a coextrusion process to form a complete rib-bearing tape does not require synthetic or natural filaments, which typically need additional treatment to bond them to a backing or carrier.

(4) The tape formed by a coextrusion process is uniform and consistent. It is not prone to some of the major defects that plague a conventional filament-reinforced tape, e.g., tape areas devoid of filaments due to yarn handling problems, cockling, buckling due to tension related differences when combining filaments with a film backing.

Figure 4:
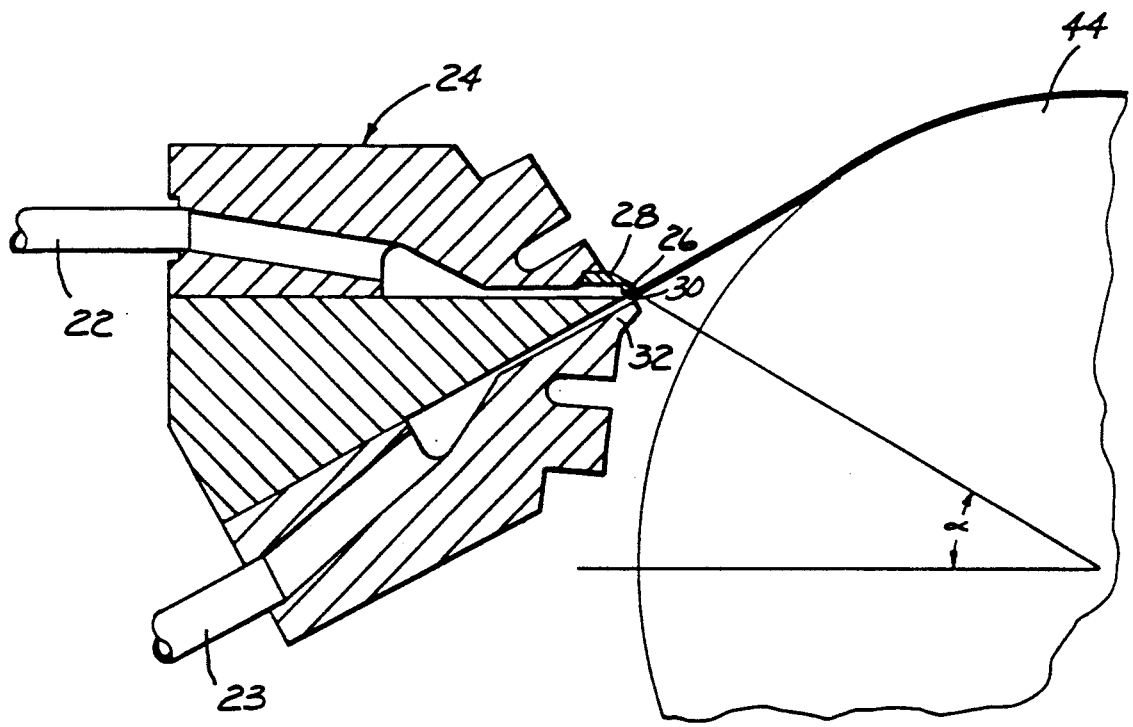
FIG. 4 shows a cross-sectional view of the coextrusion die of FIG. 2.

(5) The tape can be produced with physical properties that are equal or superior to products produced using prior art techniques. The tape of this invention is most preferably prepared by means of coextrusion techniques. Referring to FIGS. 2 and 4, two conventional extruders 20, 21 are shown. Neck tubes 22 and 23 connect extruders 20 and 21, respectively, to dual manifold die 24. Referring to FIG. 5, die 24 has a series of closely spaced orifices 26 on the top portion 28 thereof and a slot orifice 30 on the bottom portion 32 thereof, with the line of closely spaced orifices extending parallel to the elongated side of the slot orifice. The shape of these closely spaced orifices determine the shape of the ribs after extrusion and are preferably circular in cross-section. The diameters of the openings of these orifices, the height of the slot orifice, and the distance between the orifices are important parameters and can affect product performance. The distance between the bottoms of closely spaced orifices 26 and the top of slot orifice 30 is generally set at about 5 mils to ensure a good bond between the ribs and the backing. If the distance becomes too large, e.g., greater than 10 mils, excessive cooling of the molten materials can occur before a good bond between the ribs and backing can be achieved. If the distance is too small, e.g., less than 3 mils, the ribs can become too far embedded into the backing, and the cross-tear resistance of the final tape product will decrease.

The raw materials, usually in the form of pellets, are first introduced into extruders 20 and 21, then melted at their individual melting temperatures, and finally fed by way of neck tubes 22 and 23, respectively, into dual manifold extrusion die 24, each stream of raw materials independent of the other. The temperature of both extruders and the die typically exceeds the melting temperatures of the raw materials. The material for forming the backing is fed into slot orifice 30 while simultaneously the material for forming the ribs is fed into the series of closely spaced orifices 26. For the backing forming composition, polymeric material, e.g., polypropylene or polyvinyl alcohol, can be used. For the rib-forming composition, polymeric material, e.g., low density polyethylene, polypropylene, and optionally, a pigment, e.g., titanium dioxide, are used. Pigment is preferably used so that the ultimate user of the tape can better visually observe the ribs. However, the tape of this invention does not require that the ribs be pigmented. The output ratio of the backing-forming extruder to the rib-forming extruder is typically established in a range of 2:1 to 8:1, based on the weight of the materials. As the extrudates leave dual manifold die 24 in the molten state, they are immediately combined to form the rib-bearing article (See FIGS. 3 and 4). It should be noted that the combining of the rib-forming material and the backing-forming material is facilitated by gravity.

While a dual manifold die is preferred, the tape of this invention can also be prepared by a less preferred, alternative method. If the backing-forming material and the rib-forming material have a similar melting point range, they can be brought together outside a die 34 in a combining manifold 36 where the molten compositions are joined and extruded through a single die orifice 38 (see FIG. 6) to form the rib-bearing article. A single die orifice 38 comprising a plurality of notches 40 and an elongated slot is shown in FIG. 7. Difference in the melting point and viscoelastic characteristics of the backing-forming material and the rib-forming material may dictate that the materials be brought into separate manifolds with parallel die slots so that they emerge separately but are then immediately drawn together to form the rib-bearing article. For coextrusion through a single manifold die, the temperature difference of the materials can be as great as 30° C., but are preferably close to 0° C. When a dual manifold die is employed, the temperature difference between materials can be as great as 50° C. In the present invention, it is preferred that a dual manifold coextrusion die be used even if the melting ranges are similar so as to achieve optimum results.

Referring now to FIG. 3, the rib-bearing article is then drawn towards a chilled casting roll 44, which is running at a pre-determined speed, and flash cooled from a molten state to a solidified state. For polypropylene, casting roll 44 is maintained at a temperature of between 70° and 110° F. This temperature can differ for polymeric materials other than polypropylene. Tackdown of the web to casting roll 44 can be accomplished by means of either air knife or electrostatic pinning. It is preferred that the die be placed so that the web emerges therefrom parallel to the horizontal center line of casting roll 44.

If it is desired to vary the contact angle, one can vary the flow rates, extrusion rates, extrusion temperatures, or the shape of the die orifice openings. One can also vary the angle of deflection of the extrudate by repositioning the die with respect to casting roll 44 or by varying the speed of casting roll 44.

The rib-bearing article then enters the nip formed by casting roll 44 and a second casting roll 46 (not chilled), running at the same velocity as chilled roll 44, but in an opposite direction. As used herein, the term "velocity", when used with reference to any type of roll in the tape-making apparatus described herein, refers to the linear velocity of a point on the surface of the roll; the term "velocity" does not refer to revolutions per unit of time. The velocity of these rolls is controlled so that the rib-bearing article emerging from extrusion die 24 is not distorted. The velocity is usually set to match the throughput rate of the polymer emerging from slot orifice 30 to obtain a product of desired thickness. When the velocity drops too low, the material being extruded will pile up on casting roll 44, creating a heavy sheet, which is undesirable as the tape backing. If the velocity is set too high, the rib-bearing article will be reduced in width and thickness, which is also undesirable.

Regardless of the manner in which the web is formed, the rib-bearing article is preferably stretched to provide orientation in the machine direction. As the rib-bearing article leaves rolls 44, 46, it enters a series of idler rolls 48, 50 leading to the stretching station or orienting station 52 as shown in FIG. 3. Orienting station 48 comprises a series of heated rolls 53 and one unheated roll 54. The rib-bearing article is heated preferably to a temperature approaching the softening point thereof by means of heated rolls 53. The temperature range for this step is preferably within the range of 250° F. to 330° F. for polypropylene.

Idler roll 55 helps to convey the rib-bearing article to a pull roll 56, which is run at a higher constant velocity than casting rolls 44, 46. Pull roll 56 mechanically stretches the rib-bearing article to produce a thinner article having desired thickness and mechanical properties, while maintaining the characteristic structure of the article. For polypropylene, an example of a typical velocity for pull roll 56 is 57 ft/min; an example of a typical velocity for casting rolls 44 and 46 is 7.5 ft/min.

If the velocity of the casting rolls 44, and 46 is $V_1$, the thickness of the rib-bearing article is $T_1$, and the velocity of pull roll 56 is $V_2$, the final thickness of the rib-bearing article, $T_2$, is approximately equal to $(V_1/V_2)T_1$. This does not take into account reduction in width of the rib-bearing article.

The rib-bearing article is pressed against pull roll 56 typically by means of a pressure roll 58. Idler roll 60 helps to convey the oriented, rib-bearing article away from pull roll 56. It should also be noted that the contact angle between the ribs and the backing can be made to vary by varying machine direction orientation conditions.

After the machine direction orientation step, the rib-bearing article can be treated according to conventional processes to form the tape of this invention. For example, reference numeral 62 depicts apparatus that can be used to remove extraneous beads of material from the rib-bearing article and wind the rib-bearing article onto a core 78 to make a finished roll of tape.

Figure 9:
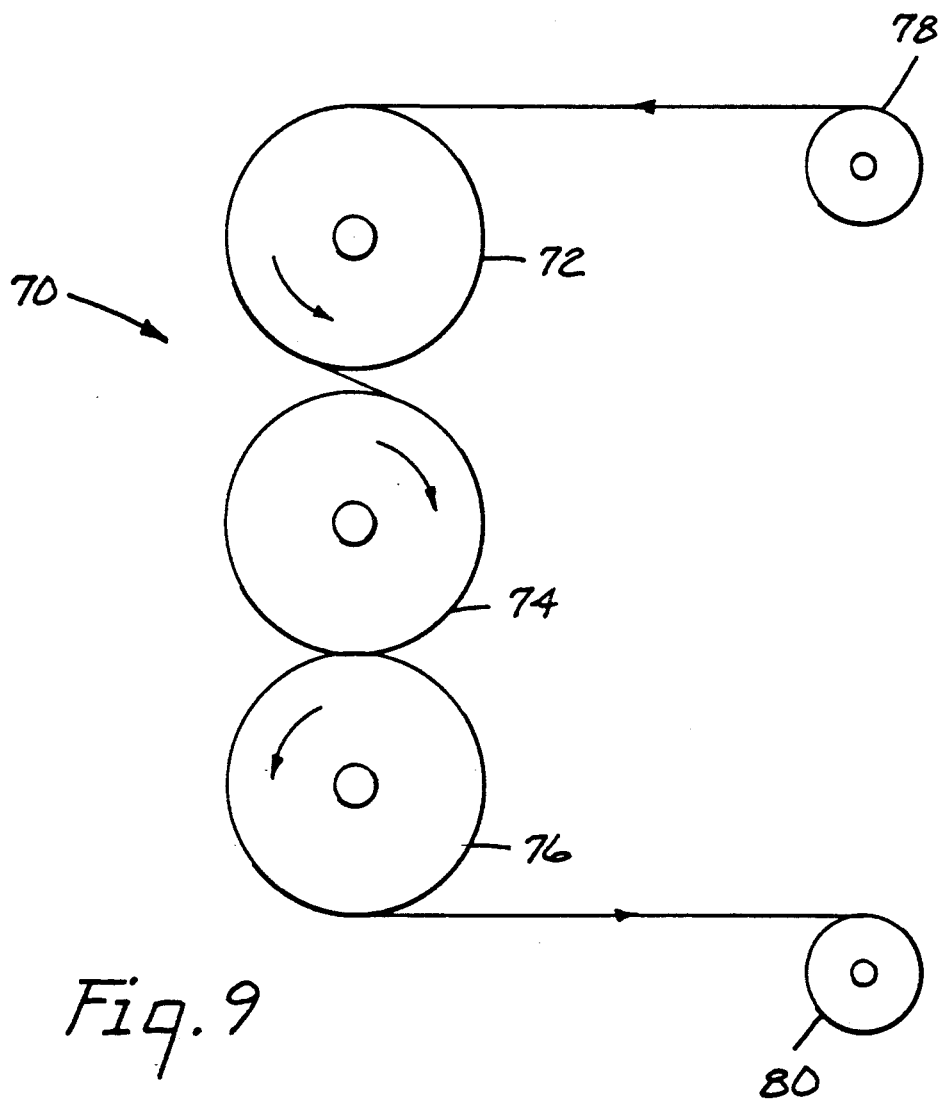
FIG. 9 shows a schematic diagram of the system used to calender the tape of the present invention.

In another embodiment of the present invention, the rib-bearing, oriented article can be calendered prior to application of the adhesive layer and low adhesion backsize layer. Calendering involves passing the article through one or more nips between metal rolls to reduce the caliper of the article as desired. A typical calendering apparatus is shown in FIG. 9, which depicts a three roll vertical calender 70, consisting of a top roll 72, a center roll 74, and a bottom roll 76. In the apparatus shown, calendering is effected at the nip between center roll 74 and bottom roll 76. For the purpose of the present invention, it is preferred to conduct the calendering operation after the rib-bearing, oriented article has the extraneous beads of material removed therefrom.

Calendering can change the shape of the ribs from a circular shape to an elliptical shape. The calendering process can also reduce the stiffness of the article, thereby rendering the article more pliable. Reducing the caliper of the article by calendering can also reduce the amount of adhesive that need be coated onto the rib-bearing surface of the article. This reduction in amount of adhesive is brought about because the flattening of the ribs resulting from calendering leads to a reduction in the volume of voids between the ribs. This reduction in void volume, in turn, further results in a smaller portion of adhesive being applied into the voids between the ribs and the larger portion of adhesive being applied onto the surfaces of the ribs, for a given volume of adhesive applied, thereby placing a larger portion of adhesive in a position where it can come into contact with surfaces to which the article will be applied. When an adhesive is coated onto the surface of the calendered article not bearing the ribs, the elliptically-shaped ribs provide an increased, and uniform, surface area for adhesion when the article is in roll form, thereby improving the unwind characteristic of the article. Calendering can also improve the cross web uniformity of the article, thereby reducing waste and rework in the manufacturing process. In general, calendering does not reduce cross tear resistance of the backing. In some instances, however, a slight reduction in cross tear resistance may be observed. In other instances, a slight increase in cross tear resistance may be observed.

In the calendering process, the primary concern is the prevention of the ribs from penetrating into the backing and thereby weakening the resistance of the backing to splitting in the machine direction, i.e., the direction parallel to the ribs. Softening the ribs prior to calendering without softening the backing is preferred. Too low a rib temperature during calendering can lead to penetration of the ribs into the backing, cutting of the backing by the ribs, and requiring higher calendering pressure to carry out the calendering step. Too high a backing temperature during calendering can lead to the reduction of the level of tape properties such as tensile and elongation, due to polymer deorientation.

A layer of adhesive can be applied over either major surface of the backing. While it is preferred to apply the layer of adhesive immediately after the machine direction orientation step or, if employed, immediately after the calendering step, it is also acceptable to apply the layer of adhesive as the ribs and backing are emerging from the extrusion die or dies. Alternatively, the layer of adhesive can be applied on a different assembly line after the article has been oriented, calendered, beads of materials removed therefrom, and the article wound upon a core, as described previously. The precise point of application of the layer of adhesive depends heavily on economic considerations. The point of application of the optional low adhesion backsize layer also depends a great deal on economic considerations. The low adhesion backsize layer can be applied prior to, subsequent to, or at the same time as application of the adhesive layer.

The adhesive-coated, rib-bearing article can then be slit and wound in a conventional manner to form rolls of tape.

The tape is generally supplied to the user unsupported, for instance as a reel, but if desired may be supplied to the user while supported on a release liner.

The tape can be of conventional width or can be narrower.

The following methods were used to evaluate the tapes made in accordance with this invention.

TEST METHODS

1. Cross Direction Tear Resistance

The cross direction tear strength was measured with an "Instron" tensile tester (available from Instron Company). The machine was set to utilize a crosshead speed of 20 inches per minute, a jaw separation of 2 inches, and a chart speed of 20 inches per minute. The load cell used is designated as the DR cell and is capable of recording a stress of 1000 lbs maximum. The setting selection for the testing of the product of this invention was a 200 lb maximum load setting.

Preparation of the Sample:

Strips of tape were cut in the machine longitudinal direction (MD) to a 1.5 inch width. The sample length was 6.0 inches. A "plexiglass" jig, cut in the shape of a triangle, was used to mark two lines at 40° angles, opposing the machine direction, across the 1.5 inch by 6.0 inch tape sample. On one side of the sample these marks were 2.0 inches apart, while on the other they were approximately 4.56 inches apart. On the short side of the marked sample (2.0 inch) a nick, one quarter inch in length, was cut into the tape across the ribs with a razor blade directly at the center between the aforementioned marks. The sample was then ready for testing.

Procedure:

The prepared sample was placed into the jaws of the tensile tester. The two reference marks were used to align the sample within the jaws so that the alignment was completed with the marks parallel to each jaw. As a result, the sample to be tested formed a natural bend on one edge of the tape and was straight on the other edge of the tape. The straight side was the side which had been cut as described in the sample preparation section. The straight side was the aforementioned short side. At initiation of applied stress, the sample was forced to tear in the cross direction. The chart recorded the value in pounds of stress at fracture of the sample.

Measurement of Results:

On all samples, the highest value from the chart recorder was taken into account along with a subjective rating of the type of failure that occurred. The excellent samples (ones that do not tear in the cross direction) always tear either up or down (in the machine direction) into the jaw. The marginal samples will first tear in the machine direction, then in the cross direction (in this case the result is achieved when the tear in the machine direction reaches the jaw). The poor samples immediately tear across the specimen in the cross direction. Observations of the type of failure using a subjective rating value of 1 for excellent material, 3 for marginal material, and 5 for material not passing the cross direction tear resistance test were also recorded.

The reason for including a subjective rating system is that the excellent samples are very difficult to evaluate, because they always tear in the machine direction and the test must be stopped due to the fracture of the sample being sheared by the jaw. At the same time the cross direction tear test is being performed, observations are made as to the type of fracture, and whether the bond of the ribs to the backing is adequate. The same type of rating system is used to determine this response.

2. Contact Angle Measurement

Microscopic photoanalysis (microtome method):

If one were to observe a cross section of the finished tape which has been cut in the cross direction of the finished tape web, he would see a layer of ribs 64 fused with a solid layer of transparent film 66. (See FIG. 8). The ribs are spaced at essentially equal distance and are preferably substantially circular in cross-section. The ribs can be discerned by means of pigment optionally added to the rib-forming composition.

The contact angle ($\alpha$) was measured from the horizontal plane of the surface of the layer of transparent film 66 to which the ribs 64 were fused.

Fusing measurement:

The amount of fusing of the ribs with the backing can be measured from a photomicrograph or can be determined by other known analytical techniques. The amount of fusing of the ribs with the backing is influenced by (1) extruder output rates, (2) the angle of deflection of the extrudate as it enters the casting roll, (3) the temperature at which the materials are extruded, and (4) the material drawing rate and the type of material used.

The amount of fusing of the ribs with the backing ranges from about 5 to about 50 percent of the original diameter of the ribs, i.e., diameter of the circular cross-section, as viewed immediately upon the ribs' emerging from the extrusion die.

The following non-limiting examples will further illustrate the present invention.

EXAMPLE I

This example involved a coextrusion die 24 which contained, in the top portion 28 thereof, a series of holes 26 machined through the face of die 24 in a straight line parallel to the direction of the material flow. Holes 26 were spaced 0.040 inch on center and were 0.020 inch in diameter. Top portion 28 of die 24 was 8 inches wide and contained 25 of the aforementioned holes per inch of width. The perpendicular distance from the lowermost portion of each hole 26 to the lowermost point of top portion 28 was 5 mils. The bottom orifice 30 consisted of a slot 8 inches wide and 25 mils high.

During the initial set up of the apparatus, extrusion die 24 was placed approximately 32° (i.e., 10 o'clock to 11 o'clock) from the horizontal center line of the chilled casting roll 44. Die 24 was placed in a position such that the extrudate emerged at an angle of 0° from the horizontal.

Two extruders 20, 21 were used to feed coextrusion die 24, one to feed a blend of virgin polypropylene resin (from FINA Cosden Chemical Division) blended with a pigment concentrate (from C. B. Edwards, Type 101p) at a mixture of 98 percent polypropylene and 2 percent pigment into the top manifold and through the top portion 28 containing holes 26 to form the ribs of the tape.

The other extruder fed the bottom manifold leading to slot orifice 30 with raw virgin polypropylene resin only to form the backing of the tape.

During the extrusion process, the two extruders 20, 21 were run simultaneously. The temperature in top extruder 20 was 525° F. and in bottom extruder 21 was 500° F. The temperature of die 24 was 500° F.

The ribs and backing were combined upon exit from die 24. At this point, the ribs and backing were immediately bonded while both were in the molten state and then drawn from the die with the aid of chilled casting roll 44.

Since chilled casting roll 44 was colder (110° F.) than the molten material, the material was solidified into a sheet which contained ribs on a backing. This sheet was pinned to chilled casting roll 44 by means of an electrostatic pinning wire before the solidified material entered the nip between unchilled casting roll 46 and chilled casting roll 44, which were both running at 3 feet per minute. At this point the cast sheet was tested for uniformity and thickness.

Upon leaving chilled casting roll 44, the material ran over two idler rolls 48, 50 and then entered a series of heated rolls 53 and one unheated roll 54 which made up machine direction orientation station 52. Heated rolls 53 were maintained at a temperature of 280° F. In this example only four heated rolls were used.

Upon exit from machine direction orientation station 52, the material entered a second set of rolls, i.e., pull roll 56 and pressure roll 58, running at a faster rate (21 feet per minute) than chilled casting roll 44, which caused the rib-bearing article to stretch in machine direction orientation station 52 to obtain the stretch ratio of seven to one.

After leaving the set of pull roll 56 and pressure roll 58, extraneous beads of the material on the rib-bearing article were removed. The rib-bearing article was trimmed to six inches in width then wound onto a core to make a finished roll of tape. A layer of pressure-sensitive adhesive and an optional low adhesion backsize layer can be applied to the tape on a separate line in a separate operation.

The roll of tape, which did not bear an adhesive layer or low adhesion backsize layer, was then tested for physical properties. Tensile strength was 367 lbs. at break, surface caliper was 10.9 mils, tape weight was 5.87 g/72 sq. in., cross direction tear was 38.0 lbs., cross directional tear rating had a value of 1. The bond of the ribs to the backing was good. The contact angle was 41°.

EXAMPLE II

This example involved the use of a rib-forming die having orifices having an omega shaped cross section. The coextrusion procedure was substantially similar to that of the process cited in Example I, with the exceptions involving minor differences in melt temperature, casting roll speed, and stretch ratio. Product characteristics, i.e., tensile, elongation, cross-direction tear, were similar to those of the product of Example I.

Tensile strength was 325 lbs. at break, tape weight was 4.7 g/72 sq. in., cross direction tear was 21.2 lbs. (average of two measurements), cross directional tear rating had a value of 1. The contact angle was 130°.

EXAMPLE III

This example involved a die 34 having a notched orifice 38 to provide a tape by means of a single manifold coextrusion technique. In this example, two extruders were used to feed a single manifold. One extruder supplied virgin polypropylene at a temperature of 460° F. [a mixture of a 1 melt flow index polypropylene resin (95% by weight) and 34 melt flow index polypropylene resin (5% by weight)] to die 34 to form the backing. The other extruder supplied a blend containing 97% polypropylene and 3% pigment concentrate at a temperature of 470° F. to die 34 to form the ribs. A "T" fitting 36 was used to combine, by means of laminar flow, the two streams of material entering the single manifold of die 34. By laminar flow, it is meant that the material of the two streams did not mix. Die 34 was located in the 9 o'clock position relative to the chilled casting roll. All of the remaining elements of the tape-forming apparatus were as described in Example I. However, the speed of the chilled casting roll was 7.0 feet per minute, and the total stretch ratio was 6.6:1. The output speed at the pull roll was 46.2 feet per minute.

Tensile strength was 204 lbs at break, elongation was 23%, surface caliper was 4.7 mils, tape weight was 3.73 g/72 sq. in., cross direction tear was 16.0 lbs., cross directional tear rating had a value of 3. The bond of the ribs to the backing was excellent. The contact angle was 158°–163°.

EXAMPLE IV

This example involves the use of a conventional extrusion die and utilizes either the tubular-, omega-, or notched-orifice dies to form the ribs. Immediately after rib formation, a pre-existing backing is laminated to the ribs so as to bear them on the surface of the backing. Following the lamination step, a layer of adhesive can be overcoated onto the rib-bearing surface of the tape to provide a finished product, which can be stored in roll form. This process is less desirable due to the cost of processing.

EXAMPLE V

This example involved a coextrusion die 24 which contained, in the top portion 28 thereof, a series of holes 26 machined through the face of die 24 in a straight line parallel to the direction of the material flow. Holes 24 were spaced 0.040 inch on center and were 0.020 inch in diameter. Top portion 28 of die 24 was 10 inches wide and contained 25 of the aforementioned holes per inch of width. The perpendicular distance from the lowermost portion of each hole 26 to the lowermost point of top portion 28 was 5 mils. The bottom orifice 30 consisted of a slot 10 inches wide and 25 mils high.

During the initial set up of the apparatus, extrusion die 24 was placed approximately 32° (i.e., 10 o'clock to 11 o'clock) from the horizontal center line of the chilled casting roll 44. Die 24 was placed in a position such that the extrudate emerged at an angle of 0° from the horizontal.

Two extruders 20, 21 were used to feed coextrusion die 24, one to feed a blend of virgin polypropylene resin (from FINA Cosden Chemical Division) blended with a pigment concentrate (from C. B. Edwards, Type 101p) at a mixture of 98 percent polypropylene and 2 percent pigment into the top manifold and through the top portion 28 containing holes 26 to form the ribs of the tape.

The other extruder fed the bottom manifold leading to slot orifice 30 with raw virgin polypropylene resin only to form the backing of the tape.

During the extrusion process, the two extruders 20, 21 were run simultaneously. The temperature in top extruder 20 was 435° F. and in bottom extruder 21 was 455° F. The temperature of die 24 was 440° F.

The ribs and backing were combined upon exit from die 24. At this point, the ribs and backing were immediately bonded while both were in the molten state and then drawn from the die with the aid of chilled casting roll 44.

Since chilled casting roll 44 was colder (81° F.) than the molten material, the material was solidified into a sheet which contained ribs on a backing. This sheet was pinned to chilled casting roll 44 by means of an electrostatic pinning wire. Unlike Example I, unchilled casting roll 46 was not used. Instead, the molten material was solidified and cooled solely by chilled casting roll 44. Upon exiting chilled casting roll 44, the material was oriented in the machine direction by means of a 3-stage stretching process. The first stage was conducted at station 52, where the material was heated by a series of rolls 53 (in this case, six rolls were used) to a temperature of 270° F. The material then entered a pair of heated stretching rolls (not shown) maintained at temperatures of 223° F. and 241° F., respectively. The speed of the first stretching roll was the same as that of the casting roll, i.e., 3 meters/min. The speed of the second stretching roll was 15 meters/min. These two rolls stretched the material at a stretch ratio of 5:1. This stretching operation was repeated at a second and a third stage (not shown) until a final stretch ratio of 7.15:1 was obtained. After orientation, rolls 54, 55, and 60 were bypassed, and, instead, the material was annealed at a temperature of 195° F. for four seconds on an annealing roll (not shown) which was situated prior to roll 56, which was chilled, and continued through the nip between roll 56 and roll 58 onto station 62. Extraneous beads at the edges of the rib-bearing article were removed in station 62 as in Example I. The rib-bearing article was trimmed to six inches in width then wound onto core 78 to make a roll of tape.

The roll of tape, which did not bear an adhesive layer or low adhesion backsize layer, was then tested for physical properties. Tensile strength was 195 lbs. at break, surface caliper was 7.5 mils, tape weight was 4.26 g/72 sq. in., cross direction tear was 40.0 lbs., cross directional tear rating had a value of 1. The bond of the ribs to the backing was good. The contact angle was 100°.

The roll was unwound and subjected to a process commonly referred to as calendering. Calendering was carried out by means of a three roll vertical calender 70, as shown in FIG. 9. Calender 70 comprised a top roll 72, a center roll 74, and a bottom roll 76.

The nip between top roll 72 and center roll 74 was set at a slightly larger distance than the thickness of the rib-bearing article to prevent calendering at that nip.

The tape was introduced into calender 70 at top roll 72, which had a surface temperature of 72° F. The rib-bearing surface of the tape was then heated by center roll 74 to soften the material thereof to facilitate calendering. The temperature of the surface of the center roll was 285° F. The calendering speed was 25 ft./min., resulting in a duration of heating of approximately two seconds. Calendering was effected at the nip between center roll 74 and bottom roll 76. The nip opening between center roll 74 and bottom roll 76 was set such that the tape was calendered to an average caliper of about 6 mil.

The surface temperature of bottom roll 76 was set at 190° F. to anneal the tape before it was wound into a roll to minimize curling. Tension was maintained throughout the calendering process to prevent wrinkles and creases from forming in the tape. A layer of pressure-sensitive adhesive and an optional low adhesion backsize layer can be applied to the tape on a separate line in a separate operation.

After leaving bottom roll 76 of calendar 70, the calendered tape was wound onto a roll 80 and tested for physical properties. The rolled, calendered tape did not bear an adhesive layer or low adhesion backsize layer.

Tensile strength was 191 lbs. at break, surface caliper was 6.0 mils, tape weight was 4.26 g/72 sq. in., cross directions tear was 34.0 lbs., cross direction tear rating had a value of 1. The bond of the ribs to the backing was good. The contact angle was 19°.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. Reinforced tape comprising a backing formed from an extrudable polymeric material, said backing bearing on at least one major surface thereof a plurality of ribs formed from an extrudable polymeric material, said ribs disposed substantially longitudinally on said backing, said backing further bearing on at least one major surface thereof a layer of adhesive, said ribs and said backing being extruded simultaneously, said ribs being fused to said backing so that the contact angle between any of said ribs and backing ranges from about 10° to about 160°, at least 50% of the original cross-section of said ribs projecting from the rib-bearing surface of said backing, said backing and said ribs being oriented in the machine direction, the cross-section tear resistance of said tape being at least 3 lbs., whereby said tape fractures in the machine direction when torn in the cross-direction.

2. The tape of claim 1 wherein the contact angle between any of said ribs and said backing ranges from about 10° to about 140°.

3. The tape of claim 1 wherein at least 80% of the original cross-section of said ribs projects from the rib-bearing surface of said backing.

4. The tape of claim 1 wherein the ribs are formed from polypropylene.

5. The tape of claim 1 wherein the ribs are formed from polyvinyl alcohol.

6. The tape of claim 1 wherein there are at least 10 ribs per inch width of backing.

7. The tape of claim 1 wherein there are at least 20 ribs per inch width of backing.

8. The tape of claim 1 wherein there are at least 30 ribs per inch width of backing.

9. The tape of claim 1 further including a low adhesion backsize layer on the major surface of the backing opposite the surface bearing the adhesive.

10. The tape of claim 1 wherein said adhesive is a pressure-sensitive adhesive.

11. The tape of claim 1 wherein said tape is calendered.

12. The tape of claim 1 wherein the extrudable polymeric material for forming said backing is different from the extrudable polymeric material for forming said ribs.

* * * * *

UNITED STATES PATENT AND TRADEMARK OFFICE
CERTIFICATE OF CORRECTION

PATENT NO. : 5,079,066
DATED : January 7, 1992
INVENTOR(S) : Leseman et al.

It is certified that error appears in the above-identified patent and that said Letters Patent is hereby corrected as shown below:

Col. 4, line 15, "(Q)" should be --(Ω)--.
Col. 4, line 64, "or" should be --of--.

Signed and Sealed this

Twenty-fifth Day of January, 1994

Attest:

BRUCE LEHMAN

Attesting Officer

Commissioner of Patents and Trademarks